United States Patent [19]

Hakansson

[11] Patent Number: 4,946,565

[45] Date of Patent: Aug. 7, 1990

[54] PROCESS FOR THE PRODUCTION OF ALKALI METAL CHLORATE

[75] Inventor: Bo Hakansson, Sundsvall, Sweden

[73] Assignee: Eka Nobel AB, Surte, Sweden

[21] Appl. No.: 260,171

[22] Filed: Oct. 20, 1988

[30] Foreign Application Priority Data

Oct. 21, 1987 [SE] Sweden .................. 8704090

[51] Int. Cl.$^5$ .............................................. C25B 1/14
[52] U.S. Cl. ...................... 204/95; 204/130; 204/98
[58] Field of Search .............. 204/95, 128, 130, 98

[56] References Cited

U.S. PATENT DOCUMENTS

| | | | |
|---|---|---|---|
| 3,407,128 | 10/1968 | Goerge | 204/95 |
| 4,155,820 | 5/1979 | Ogawa et al. | 204/98 |
| 4,207,152 | 6/1980 | Kadija et al. | 204/128 |
| 4,405,418 | 9/1983 | Takemura | 204/95 |

FOREIGN PATENT DOCUMENTS

| | | | |
|---|---|---|---|
| 139837 | 8/1906 | European Pat. Off. | |
| 362737 | 6/1906 | France | |

OTHER PUBLICATIONS

Chemical Abstracts, vol. 80, No. 16, Apr. 22, 1974, p. 136, No. 85337q.

Chemical Abstracts, vol. 96, No. 16, Apr. 1982, p. 641, No. 132160u.

Handbuch der Technischen Electrochemie, Victor Engelhardt, Leipzig 1933.

*Primary Examiner*—John F. Niebling
*Assistant Examiner*—Kathryn Gorgos
*Attorney, Agent, or Firm*—Burns, Doane, Swecker & Mathis

[57] ABSTRACT

At the production of alkali metal chlorate by electrolysis of an electrolyte containing alkali metal chloride in an electrolyzer, impurities of silicon are removed by precipitation with iron ions. Preferably, Fe(II) and/or Fe(III) can be employed as the iron ions. The iron ions can be added either to the electrolyte or to an aqueous solution of the alkali metal chloride.

13 Claims, No Drawings

PROCESS FOR THE PRODUCTION OF ALKALI METAL CHLORATE

The present invention relates to a process for the production of alkali metal chlorate by electrolysis of an electrolyte containing alkali metal chloride. More specifically the invention relates to a process for removing silicon impurities from the system.

Alkali metal chlorate, and particularly sodium chlorate, is an important chemical in the cellulose industry, where it is used as a raw material for the production of chlorine dioxide, which is an important bleaching chemical for cellulose fibers.

Alkali metal chlorate is produced by electrolysis of alkali metal chloride in an electrolyzer. The process is run in a cycle where in a first step a brine, which is an aqueous solution of the alkali metal chloride, is brought to the electrolyser for reaction at the electrodes. After the final reaction in the reactor vessels, the main part of the electrolyte is brought back to the electrolyser for further electrolysis. A smaller part of the electrolyte is brought to a crystallizer for the precipitation of chlorate crystals. The mother liquor leaving the crystallizer is also recycled for electrolysis. To compensate for consumed alkali metal chloride, fresh brine is added.

The used brines are concentrated and obtained by dissolving alkali metal chloride in water. These brines are more or less contaminated, and the content and type of contaminations depend on the alkali metal raw material. As the raw materials, vacuum salt or rock salt or other alkali metal chloride materials can be used. A typical brine contains significant amounts of calcium, magnesium, iron and silicon and other impurities.

Silicon is also added to the process by the process water and by the filter aids. The filter aids, which are used in the filtration of the sodium chlorate electrolyte, mainly consist of silicates, which are somewhat soluble in alkaline electrolyte. Even in low amounts, such as 10-50 ppm, the silicon contamination has proved to be a problem in the production of the chlorate. The silicon contamination results in deposits on the heat exchange surfaces, which strongly impairs heat transfer. The silicon contamination also results in deposits on the electrodes, causing a higher energy consumption. Both of these effects increase the costs of production and decrease the degree of utilization of the chlorate factory.

The present invention, now offers a way of purifying the original brine as well as the electrolyte from silicon contamination. It has been shown that silicon can be eliminated to a very high degree both in the brine and in the electrolyte by the addition of iron ions.

Upon the addition of iron ions to the brine or electrolyte, the iron ions form a complex with the silicon impurity. The complex is precipitated from the brine or electrolyte and can easily be filtered off.

As the iron ion, both Fe (II) and Fe (III) can be used separately or a mixture of them can be employed. However, Fe(II) is preferred because it forms a very strong insoluble complex, $Fe_2SiO_4$, with the silicon contamination, while Fe(III) forms a weaker complex.

The iron ion can be added in the form of a salt. Any iron salts in which the anion does not disturb the electrolysis can be used. However, it is preferred to use iron chlorides as the source of iron, for example $Cl^-$ can be used in the electrolysis process as the raw material for chlorate production. Another way of adding iron ions to the electrolyte is by the addition of iron metal. The iron metal corrodes in the electrolyte and thus, forms $Fe^{2+}$ in situ. Surprisingly, it has been found that the residual content of iron ions in the brine or electrolyte is low, even when a large stoichiometric excess of iron is used. This means that purification with the aid of iron chlorides or iron metal can be performed without the addition of any other elements which are detrimental to the process.

The iron salt is added in an amount which is effective in providing the desired elimination of silicon. It is suitable to use a stoichiometric excess of iron. Thus, the ratio of iron to silicon can be 2:1-20:1, or better 2:1-10:1, most preferred 5:1, expressed as mole Fe to mole Si.

The term "alkali metal chloride" preferably includes NaCl and KCl.

Preferably the process is carried out in such a way that a concentrated brine is prepared by dissolving the available raw salt material in water. The brine is pumped to a vessel in which the residence time is rather short. The solution is strongly agitated, and the pH is adjusted to about 9. The iron salt is dosed depending on the content of Si in the solution. The mixture is then brought to a sedimentation tank with a rather long residence time, for example, 1-20 hours or more. The clear solution overflows this tank and is brought, via a filter, to the electrolysis system. Sludge from the bottom of the sedimentation tank is continuously or discontinuously pumped to another filter, and the separated brine is brought back to the first vessel or to the electrolysis system.

The temperature in the purification process is 30°-80° C., preferably 40°-60° C. It has been shown that the effect of the purification is enhanced with rising temperature. This is quite contrary to what could be expected, because the solid phase usually has a higher solubility at a higher temperature.

In principle, the performance of the purification of electrolyte is carried out in the same way.

It has also been shown that the purification of silicon is favored by the presence of chloride ions. A higher grade of purification is, therefore, achieved if water containing alkali metal chloride is purified from silicon rather than if only water, with the same content of silicon, is purified. Thus, it is less suitable to purify the process water alone.

The present process can easily be combined with known processes of purification for removing contaminations of magnesium and calcium. These contaminates can be precipitated as insoluble carbonates by the addition of sodium carbonate. The process can also be combined with the purification process according to FR patent application 8701480. Thus, the present method of removing contaminations of silicon can be used on the mother liquor phase from the concentration at the preparation of purified brine slurry according to the mentioned patent application.

The content of Si in the brine and electrolyte can be reduced by over 90% by the present process.

The invention is now described with reference to the following examples:

EXAMPLE 1

A brine containing 300 g/l NaCl and 5 mg/l Si (as Si standard) is added to a vessel and agitated strongly. The pH is adjusted to about 9. The $FeCl_2 * 4 H_2O$ is dosed in an amount corresponding to 50 mg/l $Fe^{2+}$ (Fe:Si=5:1).

The solution is brought to a sedimentation tank after a residence time of less than one hour. After a residence time of between 1-20 hours, a clear solution overflows and is added to the electrolysis system. The temperature in the solution was 40° C. A test showed that the clear solution after sedimentation had a Si content of 0.8 mg/l.

When the test was repeated but the temperature was kept at 60° C., the content of Si in the purified solution was 0.1 mg/l.

Thus, the degree of purification was 84% at 40° C. and 98% at 60° C.

In order to show the dependence of the purification degree on the amount of added iron, the following test was carried out.

EXAMPLE 2

Five l of electrolyte were taken from an electrolysis cell and kept at 50° C. Twenty mg/l Si-standard were added whereby the total content of Si in the electrolyte was 23 mg/l. Five samples were taken from the prepared solution. One was kept as a standard. The $FeCl_2*4 H_2O$ was added to the others in the following molar ratio:

| Sample | Fe:Si |
|---|---|
| I | 5:1 |
| II | 10:1 |
| III | 20:1 | and $FeCl_3*6 H_2O$ with a molar ratio Fe:Si of 5:1=sample IV. After the addition, the pH was adjusted to 9. The samples were kept at 50° C. for 1.5-2 hours and were then filtrated. Analyses of silicon and iron were carried out.

Result

The analysis of iron showed less than 2 mg/l Fe in the five samples. The content of silicon was as follows:

| Sample | mg/l Si |
|---|---|
| standard | 16.6 |
| I | 0.4 |
| II | 0.3 |
| III | 0.15 |

| Sample | mg/l Si |
|---|---|
| IV | 2.2 |

As is evident, a large reduction in the silicon content was obtained by the addition of iron ions, while the sedimentation and filtration alone only resulted in a slight reduction of the silicon content.

I claim:

1. A process for the production of alkali metal chlorate comprising electrolysis of an electrolyte containing alkali metal chloride in an electrolyzer, and further comprising the removal of silicon impurities by complex formation of the silicon impurities with iron ions and precipitation wherein the iron ions comprise Fe(II) ions or a mixture of Fe(II) and Fe(III) ions.

2. A process according to claim 1, wherein the iron ions are added to the electrolyte.

3. A process according to claim 2, wherein the complex formed is allowed to settle, whereafter a clear solution is withdrawn by filtering.

4. A process according to claim 1, wherein the iron ions are added to an aqueous solution of the alkali metal chloride prior to bringing the solution to the electrolyzer.

5. A process according to claim 4, wherein the complex formed is allowed to settle, whereafter a clear solution is withdrawn by filtering.

6. A process according to claim 1, wherein the Fe(II) ions are added in the form of $FeCl_2*4 H_2O$.

7. A process according to claim 6, wherein the amount of added iron ions in relation to silicon is 2:1-20:1 expressed as mole Fe to mole Si.

8. A process according to claim 1, wherein iron metal is added to the electrolyte and the Fe(II) ions are formed in situ in the electrolyte by the corrosion of the iron.

9. A process according to claim 1, wherein the amount of added iron ions in relation to silicon is 2:1-20:1 expressed as mole Fe to mole Si.

10. A process according to claim 9, wherein the iron compound is added at a temperature of 40°-60° C.

11. A process according to claim 9, wherein the complex formed is allowed to settle, whereafter a clear solution is withdrawn by filtering.

12. A process according to claim 1, wherein the iron compound is added at a temperature of 40°-60° C.

13. A process according to claim 12, wherein the complex formed is allowed to settle, whereafter a clear solution is withdrawn by filtering.

* * * * *